United States Patent [19]

Kobayashi

[11] 4,237,175
[45] Dec. 2, 1980

[54] CARBON-FILAMENT REINFORCED GEAR

[76] Inventor: Tuguo Kobayashi, 24-8, Horifune 3-chome, Kita-ku, Tokyo, Japan

[21] Appl. No.: 914,125

[22] Filed: Jun. 9, 1978

[30] Foreign Application Priority Data

Jun. 10, 1977 [JP] Japan ................................ 52-67778

[51] Int. Cl.$^3$ ................................................. B32B 5/12
[52] U.S. Cl. .................................. 428/192; 29/159.2; 74/DIG. 10; 156/148; 156/180; 156/181; 156/250; 423/447.1; 423/447.2; 428/193; 428/246; 428/367; 428/408; 428/902
[58] Field of Search ............... 428/246, 408, 367, 902; 156/180, 181, 250, 148; 427/368; 74/DIG. 10; 29/159.2; 423/447.1, 447.2

[56] References Cited

U.S. PATENT DOCUMENTS

| | | | |
|---|---|---|---|
| 3,991,248 | 11/1976 | Bauer | 428/408 |
| 4,092,453 | 5/1978 | Jonda | 428/408 |

*Primary Examiner*—James J. Bell
*Attorney, Agent, or Firm*—Mawhinney & Mawhinney & Connors

[57] ABSTRACT

A carbon-filament reinforced gear material of laminated structure has layers of carbon filaments. The gear material includes a plurality of circular fabrics each having warps and wefts composed of a plurality of carbon filaments. The circular fabrics are laminated one on another such that the carbon filaments of their warps and wefts are substantially equiangularly spaced from those of another fabric about a common axis. The fabrics thus laminated are bound into a unitary structure by means of a binding agent of a thermosetting resin. A method for preparing the carbon-filament reinforced gear material includes the step of loosening the woven fabrics, each of which has such warps and wefts as are composed of the carbon filaments bundled into strands by means of a binding agent, by brushing the plain weave fabrics while applying thereto a binding agent so that the filaments in each of the strands may be substantially equidistantly separated from one another to make thinner and finer fabrics. The fabrics thus loosened are then laminated one on another with the above-mentioned angular relationships. The fabrics are then subjected to heat and pressure so as to set the binding agent or agents thereby to prepare the desired gear material.

9 Claims, 7 Drawing Figures

CARBON-FILAMENT REINFORCED GEAR

BACKGROUND OF THE INVENTION

1. Field of the Invention

The present invention relates to a non-metallic material for a gear, and more particularly to a carbon-filament reinforced material of laminated structure to be worked into a gear.

2. Description of the Prior Art

With a view to reducing the noises, a gear made of plastics such as a polyester resin has been widely used as a light-load gear. However, the plastic gear is limited to the light load use because no plastic material has such a strength as can stand a heavy load. The conventional plastic material for the gear is made of a thermoplastic resin so that it has poor heat resistivity (more specifically, it has been experimentally revealed to be subject to deformation at a temperature as low as about 100° C.). Thus, the conventional material has failed to find its suitable application not only in case the gear itself liberates heat due to friction but also in case the gear is used at a high temperature together with a dryer or heater. On the other hand, a gear made of fiber-glass reinforced plastics has also been developed, but it cannot enjoy sufficient fatigue strength.

With this in mind, there has been proposed the use of carbon fibers which are excellent in both the fatigue strength and the heat resistivity. In this instance, the carbon filament fabric must be of plain weave type, that is, woven fabrics in which the warps and wefts are composed of carbon filaments of several hundreds and thousands bundled into strands by means of a binding agent. Without any treatment, therefore, the binding agent will not be admixed sufficiently with a binding agent which may be made of a plastic material for adhering the plain weave fabrics together. Even if, moreover, those fabrics are laminated under pressure, the eyes or voids of the stitches left between the adjacent warps and wefts will hardly be filled up with the binding agent, thus causing the inter-layer separation.

In the case of the use of such carbon-filament reinforced fabrics, there arises another problem, in which the high speed hob of wide use for cutting operations cannot be employed because the hob itself is cut by the work. In this case, moreover, even a super hard hob cannot be expected to have excellent workability but is so remarkably worn and damaged as to deteriorate the economy. Still moreover, the working degree cannot exceed the rough ground finish. On the other hand, there is left unsolved another problem how to use the fabrics, in which carbon filaments are arranged with directivity, as a material for a gear which is intrinsically incompatible with the directivity.

SUMMARY OF THE INVENTION

It is, therefore, an object to provide a carbon-filament reinforced material of laminated structure for a gear which is free from the drawbacks concomitant with the prior art.

Another major object of the present invention is to provide a carbon-filament reinforced gear material, in which the fabrics having their warps and wefts loosened to have the carbon filaments equidistantly spaced are laminated such that the carbon filaments are equiangularly spaced from those of another fabric about a common axis which becomes the center line of the gear produced.

A further but important object of the present invention is to provide a method for preparing the carbon-filament reinforced gear material of the above type.

According to a primary aspect of the present invention, there is provided a method for preparing a carbon-filament reinforced gear material of laminated structure having layers of carbon filaments, which method comprises the steps of: loosening the woven fabrics, each of which has such warps and wefts as are composed of the carbon filaments bundled into strands by means of a binding agent, by brushing said woven fabrics while applying thereto a binding agent so that the filaments in each of the strands may be substantially equidistantly separated from one another to make thinner and finer fabrics; laminating the loosened fabrics one on another such that their carbon filaments are substantially equidistantly spaced from those of another about a common axis; and subjecting the laminated fabrics to heat and pressure so as to set the binding agents thereby to prepare the laminated material.

According to a secondary aspect of the present invention, there is provided a carbon-filament reinforced gear material of laminated structure having layers of carbon filaments, said gear material comprising: a plurality of circular fabrics each having warps and wefts composed of a plurality of carbon filaments, said circular fabrics being laminated one on another such that the carbon filaments of their warps and wefts are substantially equiangularly spaced from those of another fabric about a common axis; and a binding agent binding the laminated fabrics into a unitary structure.

BRIEF DESCRIPTION OF THE DRAWINGS

Other objects and advantages of the present invention will become apparent from the following description taken in conjunction with the accompanying drawings, in which.

DESCRIPTION OF THE PREFERRED EMBODIMENTS

Figure 1:
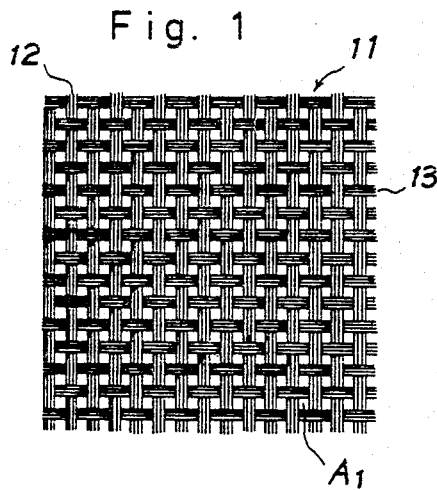
FIG. 1 is an enlarged top plan view illustrating a woven fabric of carbon filaments to be used for production of a gear.

Referring first to FIG. 1, there is illustrated in top plan view such a woven fabric 11 as is woven of warps 12 and wefts 13 which are, respectively, bundled together of a number of carbon filaments (e.g., the order of several hundreds or thousands) by means of a binding agent. As shown, there exist relatively large stitches $A_1$ between the adjacent warps and wefts 12 and 13. If, therefore, another binding agent, which may be the same as the first binding agent, is applied to the plain weave fabric 11 as it is, the binding agent will not sufficiently fill up the eyes or voids of the stitches $A_1$ formed between the adjacent warps and wefts 12 and 13, even after the fabric 11 has been laminated on another while leaving the two binding agents insufficiently admixed.

Figure 2:
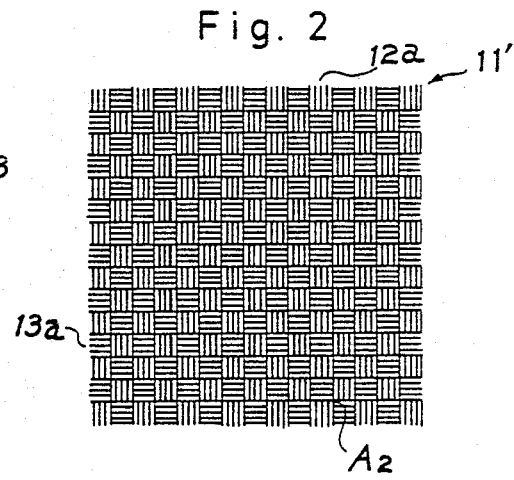
FIG. 2 is similar to FIG. 1 but shows the fabric which has its carbon filaments loosened by the brushing operation.

In order to prevent the multiple layers of the plain weave fabrics 11 of such structure from being separated from one another, a stamp, brush or roller (which may be made of any of wood, bamboo, wool, metal, cloth, plastics, rubber or the like) is used when the second binding agent is applied to each layer. This application is carried out by brushing the surfaces of each layer in the lengthwise and crosswise direction or in an oblique direction. By this brushing process, as seen from FIG. 2, the filaments 12a and 13a of the warps 12 and wefts 13 are loosened equidistantly from one another to make a finer carbon filament fabric or net 11', which is composed of the loosened filaments 12a and 13a as its warps and wefts. Indicated at letter $A_2$ are stitches which are made far smaller than those $A_1$ of FIG. 1 so that the fabric 11' itself becomes thinner. As the binding agent or agents, thermosetting plastics such as an epoxy resin can be used under a fluid condition.

The carbon filament fabrics 11' thus prepared to have uniform and fine stitches are overlaid one on another, while having their surfaces wetted with the second binding agent, and then are subjected to heat and pressure so as to prepare a laminated material for the desired gear. In order to solve the problems concomitant with both uniformity in the strength and directivity of that material, the laminating operations are accomplished in accordance with the following method.

Figure 3:
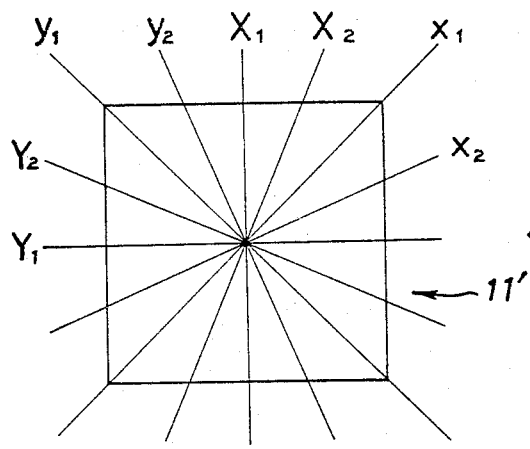
FIG. 3 is an illustrative presentation showing one example, in which the loosened fabrics are laminated one on another with an equiangular shift about a common axis.

Turning now to FIG. 3 illustrating the laminating method of the carbon filament fabrics 11', more specifically, it is assumed that the ordinate and abscissa of the first fabric 11' are designated at letters $X_1$ and $Y_1$ in case the angle of intersection of the respective filaments 12a and 13a is the right angle or 90 degrees. Then, the ordinate and abscissa $x_1$ and $y_1$ of the second fabric 11' are angularly shifted by 45 degrees from the coordinates $X_1$ and $Y_1$ about the common axis of the gear to be produced. The coordinates $X_2$ and $Y_2$ of the third fabric 11' are angularly spaced by 22.5 degrees from the coordinates $X_1$ and $Y_1$, and the coordinates $x_2$ and $y_2$ of the fourth fabric 11' are angularly spaced by 45 degrees from the coordinates $X_2$ and $Y_2$ (i.e., by 67.5 degrees from the coordinates $X_1$ and $Y_1$) which will be clear from $x_2$ and $y_2$ in FIG. 3. Similar arrangements are repeated to progressively strengthen upon each laminating operation those portions between the coordinates, which might otherwise be left unreinforced. Thus, the laminating operations of one cycle are finished when the inter-coordinate portions are sufficiently reinforced.

Here, the number of the cycles of the laminating operations, the degree of the angle of intersection between the carbon filaments 12a and 13a, and the angular spacing between those coordinates need not be limited to the values of the above embodiment but can be modified in accordance with the diameter and thickness, the size and number of the teeth of the gear to be produced, and the strength of the gear required.

Figure 4:
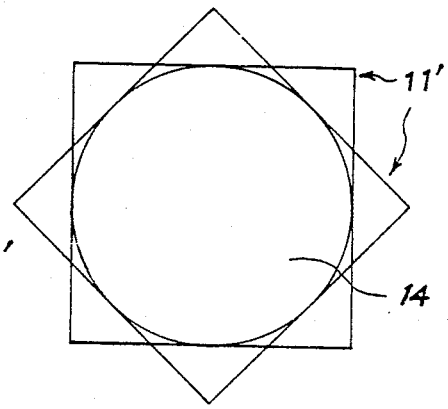
FIG. 4 is also en enlarged top plan view illustrating those portions of the carbon filament fabrics, which can be used effectively for the gear.

In order to acquire the desired sufficient effects of the laminated structure of the carbon filament fabrics 11' having the reinforcing directivity according to the above method even in case the fabrics 11' used have a square shape, as shown in FIG. 4, the gear to be produced must have a size smaller than a usable circular portion 14 which internally touches the square defined by the carbon filament fabrics 11' which are concentrically overlaid. This is because the portions of the fabrics 11' outside of the circumstance of the circular portion 14 are not wholly reinforced in their directivity.

The carbon filament fabrics 11' thus laminated have to be subjected at the final step to heat and pressure before they are finished as a material for the gear. Here, taking the workability and loss of the material into consideration, it is reasonable that the respective filament fabrics 11' are formed in advance into a circular shape of predetermined size and are then laminated and subjected to heat and pressure in the paired molds of the size corresponding to the circular shape so as to prepare the gear material of unitary structure. In view of these backgrounds, the method of preparing the desired material will now be explained with reference to FIGS. 5, 6 and 7.

Figure 5:
FIG. 5 is an axial section of the laminated material of the carbon filament fabrics for a spur gear.

FIG. 5 shows an axial section of the material for a simple spur gear 15. In this instance, the molding operations may be accomplished in accordance with the afore-mentioned method by the use of the paired simple circular molds of male and female types.

Figure 6:
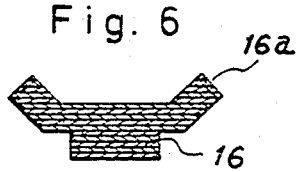
FIG. 6 is similar to FIG. 5 but shows the laminated material for a bevel gear.
Figure 7:
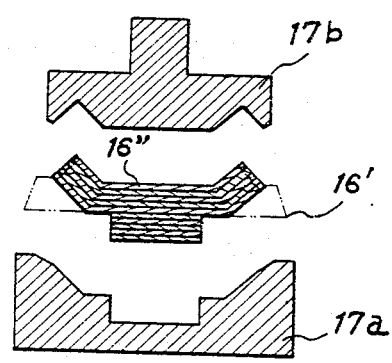
FIG. 7 is an axial section showing the laminated material for the bevel gear of FIG. 6 together with the paired molds therefor.

In case, however, the material for a bevel gear 16 is to be prepared, as shown in FIG. 6, the carbon filament fabrics have their adhered areas remarkably reduced at the circumferential edge portion 16a of the gear 16 with the resultant reduction in the mechanical sterngth. In this particular case, therefore, a laminated material 16' of flat structure, as shown at imaginary lines in FIG. 7, is prepared in advance and is subjected to heat and pressure by means of a pair of molds 17a and 17b of predetermined shape. Thus, there is produced, as shown in solid lines in the same Figure, a material 16", in which the laminated carbon filament fabrics are bent (or curved, if desired) at their outer circumferences in accordance with the face angle of the desired bevel gear. Then, the resultant edge portion 16a'' can also enjoy similar strength to that of the spur gear shown in FIG. 6.

The following description is directed to the working operation of the material 15 into the desired spur gear. As has been described, since that material cannot be subjected to the cutting operation using an existing hob, this hob is replaced by a grinding wheel which is commercially available. This grinding wheel is worked to have the shape of a desired hob and is used to cut the teeth on the material. It has been revealed by the experiments that the degree of wear of the grinding wheel can be depressed at a remarkably low level and that the material 15 itself is hardly damaged even if the working speed is raised. If it is desired to obtain a gear of high precision, the cutting process may be separated into two steps using rough and finish grinding wheels. In case such precision is not required, the cutting process can be accomplished by the use of the rough grinding wheel. For this rough cutting process, the conventional super hard job can be used with similar effects.

As has been described hereinbefore, it should be appreciated as the advantages of the present invention that the gears obtainable are superior to those of the prior art in the following points. First of all, the gears of the present invention have such a remarkably higher heat resistivity than the conventional ones using a thermoplastic resin that they can be used at a high temperature as high as 400° C. according to the Experiments, while retaining their excellent noise damping effects. Secondly, the gears of the invention can enjoy higher strengths and modulus of elasticity than those made of high tension steel, Aluminum or Titanium. Next, the gears of the invention can be subject to less wear than those made of a resin such as polyester, phenol or nylon. Next, the gears of the invention are superior in fatigue strength to those made of fiber-glass reinforced plastics. Finally, the gears of the invention can attenuate the vibrations more efficiently than those made of another material.

What is claimed is:

1. A method for preparing a carbon filament reinforced gear material of laminated structure having layers of carbon filaments, comprising the steps of:
   loosening the woven fabrics, each of which including warps and wefts being composed of multicarbon filaments bundled into strands by means of a first binding agent;
   brushing said woven fabrics in the lengthwise and cross-wise or oblique direction while applying thereto a second binding agent so that the filaments in each of the strands may be substantially equidistantly separated from one another to make thinner and finer fabrics, said warps and wefts of said woven fabrics being angularly spaced by approximately 90 degrees;
   laminating a first said woven fabric with a second said woven fabric wherein said second woven fabric being angularly shifted by approximately 45 degrees relative to said first woven fabric;
   laminating a third said woven fabric with said first and second said woven fabrics wherein said third woven fabric being angularly shifted by approximately 22.5 degrees relative to said first woven fabric;
   laminating at least a fourth said woven fabric with said first, second and third said woven fabrics wherein said fourth woven fabric being angularly shifted by approximately 67.5 degrees relative to said first woven fabric;
   repeating the laminating steps until the desired thickness of the gear material is obtained; and
   applying heat and pressure to the laminated fabrics so as to set the binding agents thereby to prepare the laminated gear material.

2. A method according to claim 1, further comprising the step of cutting said loosened fabrics into a desired shape including a circle.

3. A method according to claim 1, wherein the laminating step and the subsequent step of applying heat and pressure are carried out in a pair of molds.

4. A method for producing a carbon filament reinforced gear of the material which is prepared by the method of claim 1, comprising the step of cutting teeth on the peripheral edge of said material.

5. A method according to claim 4, wherein following the cutting step the material is subjected to both rough and finish grinding operations.

6. A carbon filament reinforced gear material of laminated structure having layers of multi-carbon filaments, comprising:
   a plurality of loosened woven fabrics each having warps and wefts being composed of a plurality of carbon filaments, said woven fabric being brushed in a lengthwise and crosswise or oblique direction while a binding agent is applied thereto to separate the multi-carbon filaments from one another forming thinner and finer fabrics wherein said warps and wefts being angularly spaced by approximately 90 degrees;
   a first said woven fabric being laminated with a second said woven fabric wherein said second said woven fabric being angularly shifted by approximately 45 degrees relative to said first woven fabric;
   a third said woven fabric being laminated with said first and second said woven fabrics wherein said third said woven fabric being angularly shifted by approximately 22.5 degrees relative to said first woven fabric;
   at least a fourth said woven fabric being laminated with said first, second and third said woven fabrics wherein said fourth said woven fabric being angularly shifted by approximately 67.5 degrees relative to said first woven fabric;
   a thickness of said laminated gear being defined by repeated progressive lamination of said woven fabrics; and
   said binding agent binding the laminated fabrics into a unitary structure upon the application of heat and pressure;
   whereby gear teeth formed on the surface of said carbon filament reinforced being an increased strength by the orientation of said warps and wefts.

7. A carbon-filament reinforced bevel gear material according to claim 6, wherein said woven fabrics are circular and bent at their outer circumferential portions in accordance with a face angle of a bevel gear.

8. A carbon filament reinforced gear material according to claim 6, wherein said binding agent contains a thermosetting resin.

9. A method according to claim 1, wherein said first binding agent is the same composition as said second binding agent.

* * * * *